No. 789,412. PATENTED MAY 9, 1905.
J. S. CUSHING.
WHEEL TIRE.
APPLICATION FILED JAN. 23, 1905.

Witnesses:
H. B. Davis
E. J. Meehan

Inventor:
Josiah S. Cushing
by Nayen Harriman
Atty

No. 789,412.

Patented May 9, 1905.

UNITED STATES PATENT OFFICE.

JOSIAH S. CUSHING, OF NORWOOD, MASSACHUSETTS.

WHEEL-TIRE.

SPECIFICATION forming part of Letters Patent No. 789,412, dated May 9, 1905.

Application filed January 23, 1905. Serial No. 242,229.

*To all whom it may concern:*

Be it known that I, JOSIAH S. CUSHING, of Norwood, county of Norfolk, State of Massachusetts, have invented an Improvement in Wheel-Tires, of which the following description, in connection with the accompanying drawings, is a specification, like characters on the drawings representing like parts.

This invention relates to wheel-tires especially designed for automobiles and other vehicles requiring very durable yet moderately resilient tires.

Figure 1:
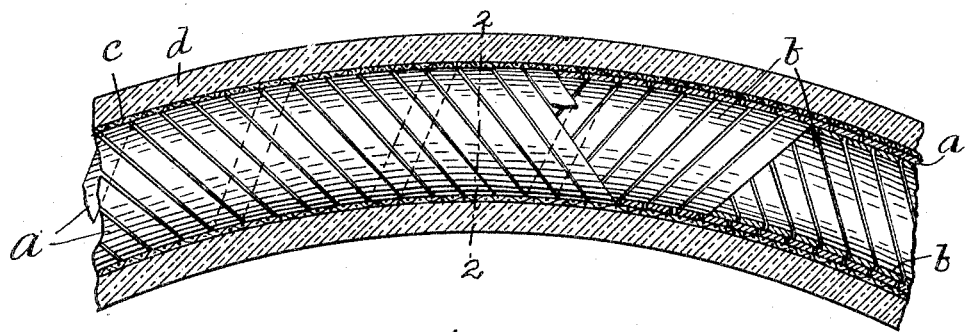
Figure 2:
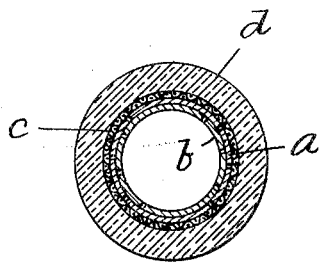
Figure 3:
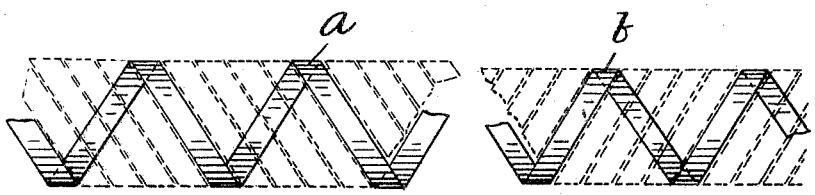

The wheel-tire embodying this invention comprises, essentially, two sets of helical springs contained one within the other, each set consisting of a plurality of circularly-formed helical springs of the same diameter disposed relative to each other, with their coils or rounds close together and in parallelism, the springs of the inner set being of smaller diameter than the springs of the outer set and the coils or rounds thereof extending in the opposite direction, and one or more circularly-formed tubular layers inclosing said springs, which act to hold them in their relative positions, the outermost tubular layer, if more than one layer is employed, also serving as the tread of the tire, Figure 1 shows in longitudinal vertical section a portion of a wheel-tire embodying this invention, a portion of the outer set of springs and a portion of the inner set of springs being shown in elevation. Fig. 2 is a vertical section of the wheel-tire shown in Fig. 1, taken on the dotted line 2 2. Fig. 3 shows details of portions of one of the outer and one of the inner helical springs removed.

$a$ represents one of the helical springs of the outer set, and $b$ one of the helical springs of the inner set, made of flat metal, the coils or rounds thereof being widely separated. In each set several of these springs will be employed, and all the springs of each set will be made of the same diameter, the springs of the inner set being smaller than the springs of the outer set. The springs of each set will be turned on their axes into each other until the coils or rounds of the several springs lie close together and in parallelism, thereby producing two yielding tubular elements. The two sets of springs are contained one within the other and so arranged that the coils or rounds extend in opposite or different general directions, and they are formed circularly to conform to the shape of the tire. The number of helical springs employed in each set will be sufficient for the coils or rounds thereof when lying close together and in parallelism to be practically contiguous. As herein shown, each set comprises five helical springs. The two sets of circularly-formed helical springs thus disposed relative to each other are inclosed by one or more circularly-formed tubular layers $c$ $d$, two such layers being herein shown; but so far as my invention is concerned I do not desire to limit it to the number of circularly-formed tubular layers employed nor to the construction of said layers nor to the material or materials composing them. The outermost tubular layer will serve as the tread of the tire. The tubular layers act to hold the several helical springs in their relative positions, as well as serve to complete the general construction of the tire.

I am aware that a single circularly-formed helical spring has been employed in a wheel-tire; but its coils or rounds were disposed close together, and necessarily so, to prevent the production of wide-open spaces between the coils or rounds; but such a spring will not yield to pressure as readily as is required. In fact, in practice it is exceedingly rigid; but by employing a plurality of helical springs the coils or rounds of which are widely separated and disposing them relative to each other so that the coils of the several springs lie close together and in parallelism a very resilient tire is produced which is exceedingly durable.

In practice I may employ but one set of helical springs; but I prefer to employ two sets, as herein shown, and in some instances I may employ more than two sets.

Having thus described my invention, what I claim as new, and desire to secure by Letters Patent, is—

1. A wheel-tire comprising a circularly-formed tubular element consisting of a plurality of helical springs of the same diameter, disposed relative to each other, with their coils or rounds close together, and in parallelism, and one or more circularly-formed tubular layers inclosing said springs, substantially as described.

2. A wheel-tire comprising a circularly-formed tubular element consisting of two sets of helical springs, contained one within the other, their coils extending in different directions, the springs of each set being of the same diameter and disposed relative to each other with their coils or rounds close together and in parallelism, and one or more circularly-formed tubular layers inclosing said springs, substantially as described.

In testimony whereof I have signed my name to this specification in the presence of two subscribing witnesses.

JOSIAH S. CUSHING.

Witnesses:
W. FRED. WIGMORE,
OLIVER J. BARR.